Figure 1:
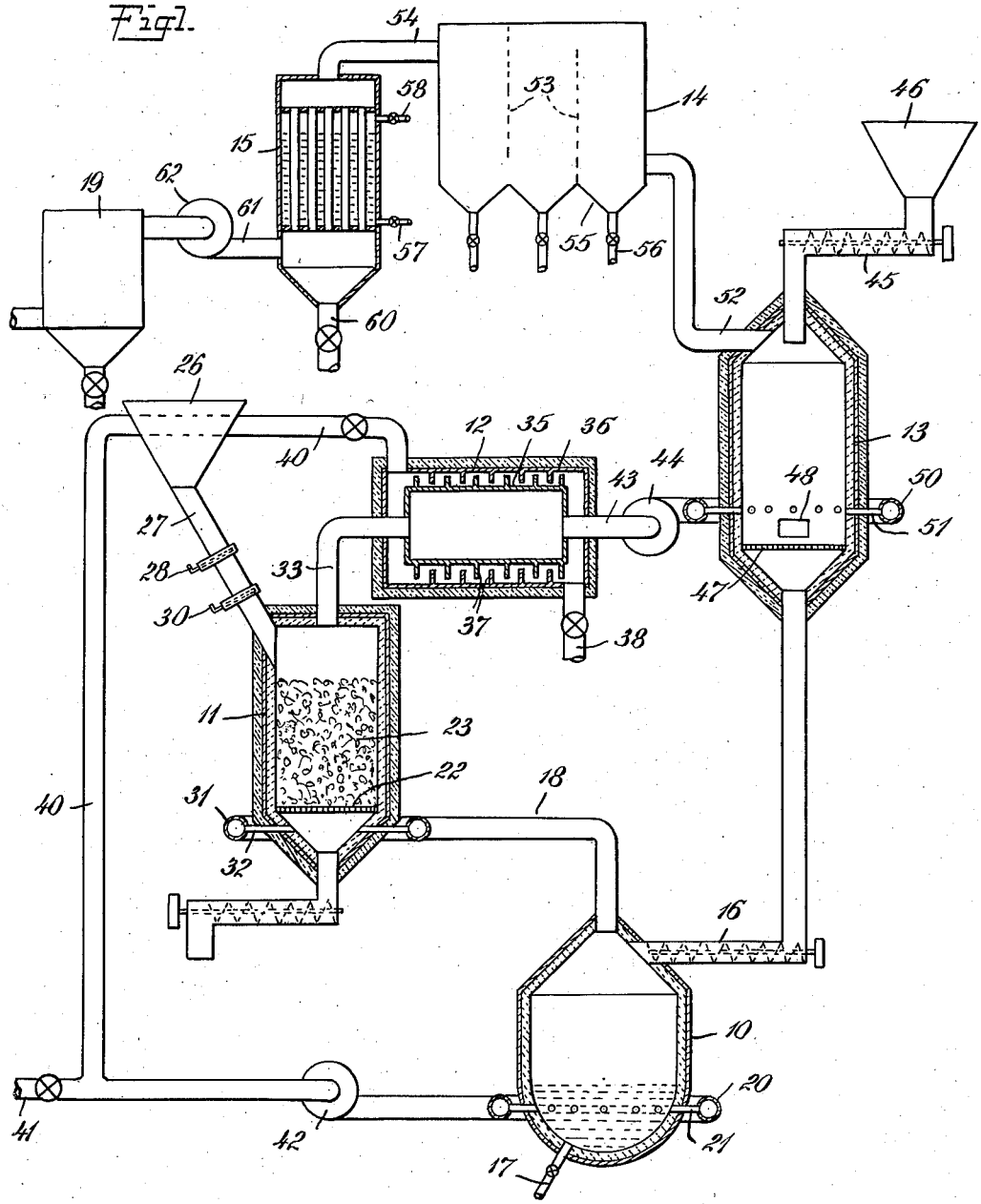

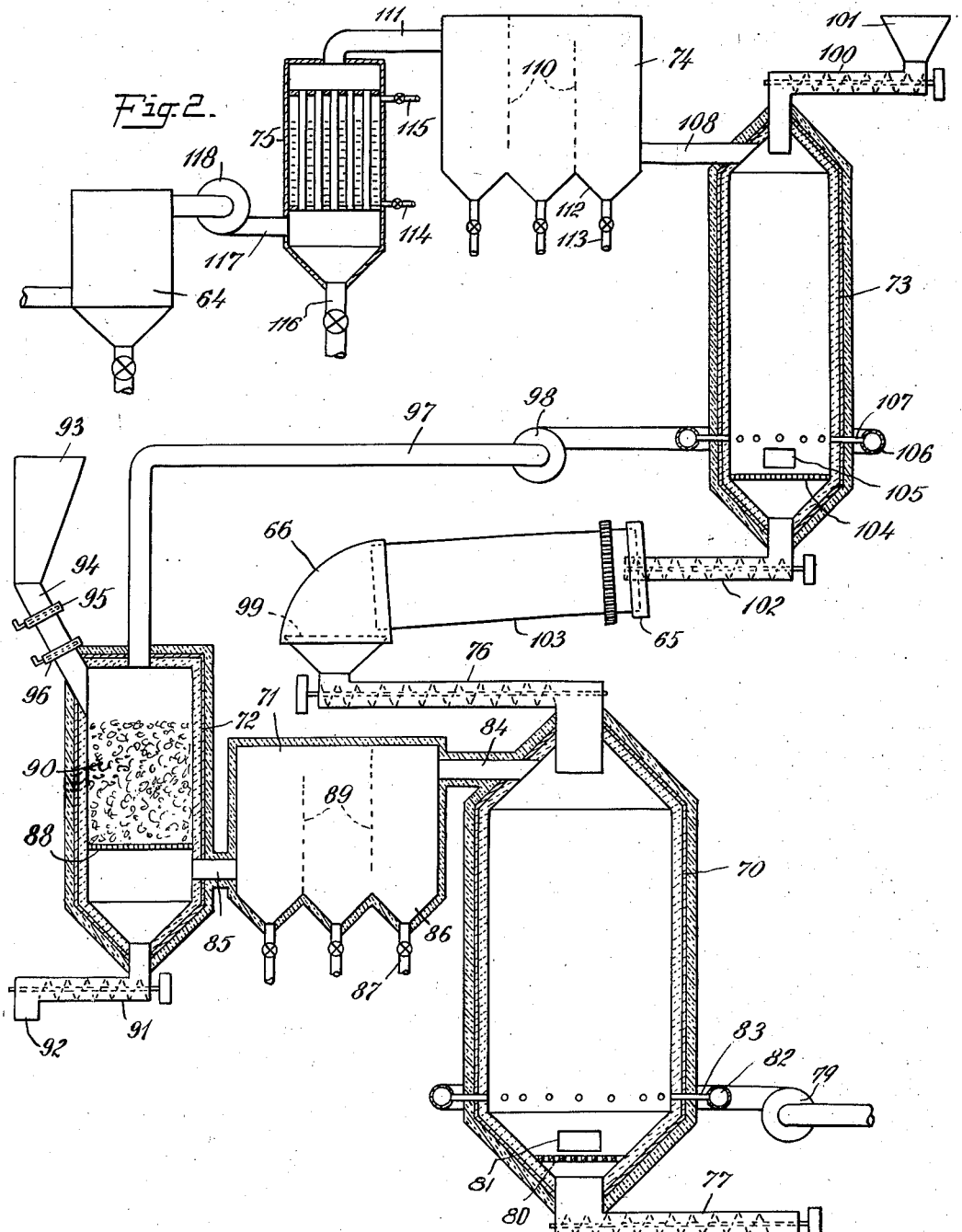

Patented July 27, 1937

2,087,890

UNITED STATES PATENT OFFICE 2,087,890

RECOVERY OF SULPHUR

Raymond F. Bacon, Bronxville, N. Y., and Wilber Judson, Newgulf, Tex.

Application October 18, 1934, Serial No. 748,948

6 Claims. (Cl. 23—226)

This invention relates to the recovery of sulphur and has for an object the provision of an improved process and apparatus for recovering elemental sulphur from metal sulphide-bearing material. More particularly, the invention contemplates the provision of an improved process and apparatus for recovering elemental sulphur from pyrites.

The present invention contemplates the effective utilization of heat capable of being developed by reactions involved in or associated with the oxidation of pyrites for the recovery of the sulphur of the pyrites in elemental form. The method of the invention involves the oxidation of an iron sulphide product resulting from the distillation of pyrites under such conditions as to produce sufficient heat to facilitate the reduction of sulphur dioxide produced in the oxidizing operation and to effect the distillation of the pyrites. According to a preferred method of the invention, the iron sulphide residue from a pyrites distillation operation is subjected to an oxidizing treatment while molten to produce iron oxide and a gaseous product containing sulphur dioxide. According to another preferred method of the invention, the iron sulphide residue from a pyrites distillation operation is subjected to a suspension roasting operation to produce iron oxide and a gaseous product containing sulphur dioxide. The oxidizing operations are so controlled that the temperatures of the gaseous products are sufficiently high to effect a reaction between the sulphur dioxide contained therein and a reducing agent. The gaseous product of the oxidizing operation is passed in contact with a reducing agent to effect the reduction of the sulphur dioxide contained therein to elemental sulphur. Any suitable type of apparatus may be employed for carrying out the reducing operation. For example, the hot gases from the oxidizing operation may be passed in contact with a porous bed of coke in a suitable reaction chamber, or the gases may be passed through a rotary kiln in which a charge of coke is maintained.

The hot gaseous product of the reducing operation, containing elemental sulphur vapor, is passed in contact with finely divided pyrites in suspension to distill the volatile sulphur of the pyrites and to produce an iron sulphide product which is subsequently treated in the oxidizing operation.

The invention will be better understood from a consideration of the following description in conjunction with the accompanying drawings showing schematically apparatus which may be employed in carrying out a process of the invention and in which Fig. 1 illustrates apparatus for use in carrying out the method of the invention when the residue from the distillation operation is subjected to the action of an oxidizing gas while molten; and Fig. 2 illustrates apparatus for use in carrying out the method of the invention when the residue from the distillation operation is subjected to the action of an oxidizing gas while in suspension in the oxidizing gas.

The apparatus shown in Fig. 1 of the drawings comprises an oxidizing chamber 10 in the form of a molten bath receptacle, a reducing furnace 11, a heat exchanger 12, a distillation chamber 13, a dust collector 14, a condenser 15 and an electrical precipitator 19, all so connected by means of suitable conduits that gases from the oxidizing chamber may be subjected successively to reducing and heat exchanging treatments, utilized for distillation purposes, and subjected successively to dust removing, cooling or condensing and precipitating treatments.

The oxidizing chamber 10 is similar in structure to an ordinary copper converter, and comprises a steel outer shell lined with refractory material such as magnesite brick. The upper portion of the oxidizing chamber communicates with a screw conveyor 16 which is adapted to deliver materials to be treated to the oxidizing chambers. The screw conveyor 16 is so constructed and arranged that materials may be delivered to the oxidizing chamber without admitting air. The lower portion of the oxidizing chamber is provided with a tapping spout 17 through which the molten oxidized product may be withdrawn upon completion of the oxidizing treatment.

The upper portion of the oxidizing chamber is tightly connected to a conduit or flue 18. An annular manifold 20 surrounding the oxidizing chamber and communicating therewith through tuyères 21 is provided for introducing air into the oxidizing chamber.

The oxidizing chamber may be stationary or mounted for tilting movement on any suitable type of supporting structure.

The reducing furnace 11 is an upright cylindrical chamber lined throughout with heat refractory material and having a covering of heat insulating material. A grate 22 capable of supporting a porous bed of coke 23 is disposed between the top and bottom of the furnace. The lower portion of the furnace communicates with a screw conveyor 24 which is adapted to convey ash from the interior of the furnace to the discharge outlet 25. Coke may be introduced into the interior of the furnace above the grate from a storage hopper 26 through a pipe 27 having valves 28 and 30 therein. The valves 28 and 30 may be operated alternately to admit coke to the interior of the furnace without admitting air. The screw conveyor 24 is so constructed and arranged as to seal the furnace against the admission of air during the course of ash removal. An annular manifold 31 surrounds the lower portion of the furnace and communicates with the interior thereof below the grate 22 through the tuyères 32. The manifold 31 communicates with the conduit 18 leading from the oxidizing chamber. The conduit 18 is of such a length and insulated in such a manner that gases may be delivered from the oxidizing chamber 10 to the reducing furnace 11 without any substantial loss of heat. A gas outlet 33 disposed adjacent the top of the reducing furnace communicates with the heat exchanger 12.

The heat exchanger 12 comprises an inner chamber 35 formed of good heat conducting material and a heat insulated jacket 36 surrounding the inner chamber and having its walls spaced from the walls of the inner chamber to provide a passage therebetween. The passage between the inner chamber 35 and the jacket 36 of the heat exchanger is provided with staggered baffles 37 for providing a tortuous path of travel for gases. Air may be admitted to the passage between the inner chamber 35 and the jacket 36 through an inlet 38, and heated air may be withdrawn through a conduit 40 which communicates with the manifold 20 associated with the oxidizing chamber. An air inlet 41 open to the atmosphere or connected to a suitable source of air under pressure (not shown) communicates with the conduit 40. A blower 42 is included in the conduit 40 to cause a flow of air through the heat exchanger and to aid in introducing air into the oxidizing chamber.

A conduit 43 having a fan 44 included therein provides a passage for conducting gases from the interior of the inner chamber 35 of the heat exchanger to the distillation chamber 13. The distillation chamber 13 is an upright cylindrical chamber similar in structure to the roasting chamber. The upper portion of the distillation chamber communicates with a screw conveyor 45 which is adapted to deliver materials for distillation from a storage hopper 46 to the distillation chamber. The lower portion of the distillation chamber communicates with the screw conveyor 16 which delivers materials to the oxidizing chamber. The screw conveyors 45 and 16 are so constructed and arranged that materials may be delivered to and removed from the distillation chamber without admitting air. A grate 47 is disposed within the lower portion of the distillation chamber to collect agglomerations too large for convenient passage through the conveyor 16. A work hole 48 provided with a suitable removable cover permits access to the interior of the distillation chamber for the purpose of removing or breaking agglomerations collected on the grate 47. An annular manifold 50 surrounding the distillation chamber and communicating therewith through tuyères 51 is provided for introducing hot gases from the heat exchanger 12 through the conduit 43 to the interior of the distillation chamber.

A conduit 52 provides a passage for conducting gases from the interior of the distillation chamber to the interior of the dust collector 14. The dust collector is provided with a series of baffles 53 so arranged as to provide a tortuous path for the flow of gases between the inlet conduit 52 and the outlet 54. The bottom of the dust collector is provided with a number of hoppers 55 for the reception of dust particles removed from the gas stream. The hoppers 55 are provided with valved outlets 56 through which dust particles collected in the hoppers may be withdrawn. The outlet 54 of the dust collector communicates with the upper portion of the condenser 15.

The condenser 15 is in the form of a fire tube boiler provided with a valved inlet 57 for water and a valved outlet 58 for steam. Condensate formed in the condenser may be withdrawn from the lower portion thereof through a valved outlet 60. Gases may be withdrawn from the condenser through an outlet 61 having a fan 62 included therein and delivered to the electrical precipitator 19 which may be of any suitable construction.

The apparatus shown in Fig. 2 of the drawings comprises a suspension roasting chamber 70, a dust collector 71, a reducing furnace 72, a distillation chamber 73, a dust collector 74, a condenser 75 and an electrical precipitator 64, all so connected by means of suitable conduits that gases from the roasting chamber may be subjected to dust removing and reducing treatments, utilized for distillation purposes, and subjected successively to dust removing, cooling or condensing and precipitating treatments. The roasting chamber 70 is an upright cylindrical chamber covered with heat insulating material and provided with a heat refractory lining. The upper portion of the roasting chamber communicates with a screw conveyor 76 which is adapted to deliver materials to be roasted to the roasting chamber. The lower portion of the roasting chamber communicates with a screw conveyor 77 which is adapted to convey solid materials from the roasting chamber to a discharge outlet 78. The screw conveyors 76 and 77 are so constructed and arranged that materials may be delivered to and removed from the roasting chamber without admitting air. A grate 80 is disposed within the lower portion of the roasting chamber to collect agglomerations too large for convenient passage through the conveyor 77. A work hole 81 provided with a suitable removable cover permits access to the interior of the roasting chamber for the purpose of removing or breaking agglomerates collected on the grate 80. An annular manifold 82 surrounding the roasting chamber and communicating with a fan 79 and with the interior of the roasting chamber through tuyères 83 is provided for introducing air into the roasting chamber.

A conduit 84 provides a passage for conducting gases from the roasting chamber to the dust collector 71. The dust collector 71 is provided with a series of baffles 89 so arranged as to provide a tortuous path for the flow of gases between the inlet conduit 84 and an outlet conduit 85. The bottom of the dust collector 71 is provided with a number of hoppers 86 for the reception of dust particles removed from the gas stream. The hoppers 86 are provided with valved outlets 87 through which dust particles collected in the hoppers may be withdrawn. The outlet 85 of the dust collector communicates with the lower portion of the reducing furnace 72.

The reducing furnace 72 is an upright cylindrical chamber lined throughout with heat refractory material and having a covering of heat insulating material. A grate 88 capable of supporting a porous bed of coke 90 is disposed between the top and bottom of the furnace. The lower portion of the furnace communicates with a screw conveyor 91 which is adapted to convey ash from the interior of the furnace to the discharge outlet 92. Coke may be introduced into the interior of the furnace above the grate from a storage hopper 93 through a pipe 94 having valves 95 and 96 therein. The valves 95 and 96 may be operated alternately to admit coke to the interior of the furnace without admitting air. The screw conveyor 91 is so constructed and arranged as to seal the furnace against the admission of air during the course of ash removal.

The outlet 85 of the dust collector 71 conducts hot gases from the dust collector and the roasting chamber to the portion of the reducing furnace below the grate 88. The dust collector and the inlet and outlet conduits 84 and 85 are insulated in such a manner that gases may be delivered from the roasting chamber to the reducing furnace without any substantial loss of heat. A conduit 97 having a fan 98 included therein communicates with the upper portion of the reducing furnace and the lower portion of the distillation chamber 73. The conduit 97 is of such length and sufficiently exposed that the gases from the reducing furnace will be below the temperature at which fusion or sintering of pyrites occurs when they reach the distillation chamber 73.

The distillation chamber 73 is an upright cylindrical chamber similar in structure to the roasting chamber. The upper portion of the distillation chamber communicates with a screw conveyor 100 which is adapted to deliver materials for distillation from a storage hopper 101 to the distillation chamber. The lower portion of the distillation chamber communicates with a screw conveyor 102 which delivers materials to a grinding mill 103. Materials from the grinding mill are delivered to a hopper 99 and thence to the screw conveyor 76 in suitable form for suspension roasting. Hoods 65 and 66 surround the feed and discharge ends of the grinding mill and prevent contact of the atmosphere with the material delivered to and discharged from the grinding mill. The screw conveyors 100 and 102 are so constructed and arranged that materials may be delivered to and removed from the distillation chamber without admitting air. A grate 104 is disposed within the lower portion of the distillation chamber to collect agglomerations too large for convenient passage through the conveyor 102. A work hole 105 provided with a suitable removable cover permits access to the interior of the distillation chamber for the purpose of removing or breaking agglomerations collected on the grate 104. An annular manifold 106 surrounding the distillation chamber and communicating therewith through tuyères 107 is provided for introducing hot gases from the conduit 97 to the interior of the distillation chamber.

A conduit 108 provides a passage for conducting gases from the interior of the distillation chamber to the interior of the dust collector 74. The dust collector 74 is similar to the dust collector 71, being provided with a series of baffles 110 so arranged as to provide a tortuous path for the flow of gases between the inlet conduit 108 and an outlet 111. The bottom of the dust collector 74 is provided with a number of hoppers 112 for the reception of dust particles removed from the gas stream. The hoppers 112 are provided with valved outlets 113 through which dust particles collected in the hoppers may be withdrawn. The outlet 111 of the dust collector communicates with the upper portion of the condenser 75.

The condenser 75 is in the form of a fire tube boiler provided with a valved inlet 114 for water and a valved outlet 115 for steam. Condensate formed in the condenser may be withdrawn from the lower portion thereof through a valved outlet 116. Gases may be withdrawn from the condenser through an outlet 117 having a fan 118 included therein and delivered to the electrical precipitator 64 which may be of any suitable construction.

In employing the apparatus illustrated in Fig. 1 of the drawings for carrying out a method of the invention, pyrites in finely divided form, preferably minus 40 mesh, is introduced into the upper portion of the distillation chamber 13 from the storage hopper 46 by means of the screw conveyor 45. The pyrites particles, in passing downwardly through the distillation chamber, encounter an upwardly rising current of hot gases introduced into the chamber from the heat exchanger 12 through the manifold 50 and tuyères 51. The heat contained in the gases functions to effect the distillation of the volatile sulphur of the pyrites, forming elemental sulphur vapor and a solid iron sulphide product. The solid iron sulphide product passes downwardly through the grate 47 to the screw conveyor 16 which delivers it to the oxidizing chamber 10. The iron sulphide-bearing material passes downwardly into a molten bath in the bottom of the oxidizing chamber.

Operation of the oxidizing chamber may be initiated by melting a small charge of iron sulphide-bearing material in the chamber by combustion of any suitable fuel or by retaining a portion of a molten bath produced in a preceding operation.

Air is introduced into the molten bath in the oxidizing chamber through the manifold 20 and tuyères 21. The oxygen of the air reacts with the iron sulphide to produce gaseous sulphur dioxide and molten iron oxide. The introduction of iron sulphide-bearing material into the oxidizing chamber may be continued for periods varying from one to several hours until the operating capacity of the chamber has been reached. When charging has been completed, blowing is continued until substantially all sulphur has been removed. The resulting molten bath, consisting largely of iron oxide is then removed through the tapping spout. A substantially oxygen-free gaseous product containing sulphur dioxide will be produced during the major portion of the blowing treatment. When the sulphur content of the molten charge is nearly exhausted the free oxygen content of the gaseous product tends to increase. The operation is preferably so conducted that the gaseous product delivered from the oxidizing chamber to the reducing furnace contains not more than about one percent of free oxygen. If desired, two or more oxidizing chambers may be employed in order to deliver sulphur dioxide to the reducing furnace continuously. When two or more oxidizing chambers are employed, they are operated in staggered relationship and means are provided for selectively connecting the oxidizing chambers in series and parallel, thus permitting the gaseous product from a chamber containing a molten charge substantially free of sulphur to be passed through a molten charge of higher sulphur content in another oxidizing chamber. By passing the gaseous product obtained in the treatment of a charge of relatively low sulphur content through a charge or bath of relatively high sulphur content, substantially all free oxygen contained in the gaseous product may be consumed and the continuous delivery of a substantially oxygen-free gaseous product to the reducing furnace may be insured. The sulphur dioxide, together with inert gases introduced into the roasting chamber with the air, passes through the conduit 18 to the lower portion of the reducing furnace 11.

The roasting operation is so conducted that the gases entering the reducing furnace have a temperature higher than about 1000° C. and preferably about 1200° C. or higher. The hot gases entering the lower portion of the reducing furnace pass upwardly through the porous bed of coke 23. The temperature of the gases is sufficiently high to maintain the coke in an incandescent state, and the carbon of the coke, therefore, reacts with the sulphur dioxide contained in the gases to effect its reduction and produce elemental sulphur. The gases containing elemental sulphur pass from the reducing chamber through the conduit 33 into the heat exchanger 12 and, during the course of their passage through the heat exchanger, the temperature is reduced by the transfer of heat to air drawn through the passage between the inner chamber 35 and the jacket 36. The air thus heated is introduced into the oxidizing chamber to aid in maintaining the desired temperature. Additional control of the temperature within the oxidizing chamber may be accomplished through the admission of varying amounts of cold air through the inlet 41. The gases from the inner chamber 35 of the heat exchanger are delivered to the interior of the distillation chamber 13 through the conduit 43, manifold 50 and tuyères 51 at a temperature of about 500° C. to 900° C.

Gases containing the volatile sulphur of the pyrites together with the elemental sulphur produced by the reduction of sulphur dioxide in the furnace 11 are withdrawn from the upper portion of the distillation chamber through the conduit 52 and delivered to the dust collector 14. The sulphur laden gases pass through the dust collector to the outlet 54 and, during the course of their passage through the dust collector, substantially all dust particles are removed. The cleaned gases passing out of the dust collector through the conduit 54 enter the condenser 15 in which a temperature sufficiently low to effect condensation of the sulphur vapor contained in the gases is maintained. A temperature of about 115° C. to 150° C. is preferably maintained in the condenser. Substantially sulphur free gases are conducted from the condenser through the conduit 61 to the electrical precipitator 19 in which entrained sulphur particles may be removed. Molten sulphur collected in the lower portion of the condenser is withdrawn through the outlet 60.

In employing apparatus of the type illustrated in Fig. 2 of the drawings for carrying out a method of the invention, pyrites in finely divided form, preferably minus 40-mesh, is introduced into the upper portion of the distillation chamber 73 from the storage hopper 101 by means of the screw conveyor 100. The pyrites particles, in passing downwardly through the distillation chamber, encounter an upwardly rising current of hot gases introduced into the chamber from the conduit 97 through the manifold 106 and tuyères 107. The heat contained in the gases functions to effect the distillation of the volatile sulphur of the pyrites, forming elemental sulphur vapor and a solid iron sulphide product. The solid iron sulphide product passes downwardly through the grate 104 to the screw conveyor 102 which delivers it to the grinding mill 103 in which the particles are reduced to sizes suitable for suspension roasting and delivered to the roasting chamber through the hopper 99 and the screw conveyor 76. The iron sulphide-bearing material is showered downwardly through the roasting chamber 70 and in passing downwardly through the roasting chamber the particles encounter an upwardly rising current of air introduced into the roasting chamber through the manifold 82 and tuyères 83. The oxygen of the air reacts with the iron sulphide to produce gaseous sulphur dioxide and solid iron oxide. The solid iron oxide collects in the lower portion of the roasting chamber and is removed therefrom by means of the screw conveyor 77. The sulphur dioxide, together with inert gases introduced into the roasting chamber with the air, passes through the dust collector 71 to the lower portion of the reducing furnace 72.

The roasting operation is so conducted that the resulting gaseous product is substantially free of oxygen and enters the reducing furnace at a temperature higher than about 1,000° C. and preferably about 1,200° C. or higher. The operation is preferably so conducted that the gaseous product delivered from the roasting chamber to the reducing furnace contains not more than about one percent of free oxygen. The hot gases entering the lower portion of the reducing furnace pass upwardly through the porous bed of coke 90. The temperature of the gases is sufficiently high to maintain the coke in an incandescent state, and the carbon of the coke, therefore, reacts with the sulphur dioxide contained in the gases to effect its reduction and produce elemental sulphur. The gases containing elemental sulphur pass from the reducing chamber through the conduit 97, manifold 106 and tuyères 107 into the interior of the distillation chamber.

Gases containing the volatile sulphur of the pyrites together with the elemental sulphur produced by the reduction of sulphur dioxide in the furnace 72 are withdrawn from the upper portion of the distillation chamber through the conduit 108 and delivered to the dust collector 74. The sulphur laden gases pass through the dust collector to the outlet 111 and, during the course of their passage through the dust collector, substantially all dust particles are removed. The cleaned gases passing out of the dust collector through the conduit 111 enter the condenser 75 in which a temperature sufficiently low to effect condensation of the sulphur vapor contained in the gases is maintained. A temperature of about 115° C. to 150° C. is preferably maintained in the condenser. Substantially sulphur free gases are conducted from the condenser through the conduit 117 to the electrical precipitator 64 in which entrained sulphur particles may be removed. Molten sulphur collected in the lower portion of the condenser is withdrawn through the outlet 116.

It is to be understood that the apparatus illustrated in the drawings is merely illustrative and is not intended to be restrictive of the invention in any respect.

We claim:

1. The method of producing elemental sulphur which comprises subjecting pyrites in a distillation chamber to a distillation operation in such manner that distillation of the volatile sulphur atom is effected and a product corresponding substantially to the monosulphide of iron is produced, subjecting the resulting monosulphide in a suitable chamber to an oxidizing operation at a temperature substantially above 1,000° C. under such conditions that a high-temperature gaseous product containing sulphur dioxide is formed, withdrawing said gaseous product from the oxidizing chamber, passing the gaseous product after such withdrawal in contact with a bed of coke so as to reduce the sulphur dioxide and form a gaseous product containing elemental sulphur, and passing the gaseous product containing elemental sulphur in contact with pyrites in the distillation chamber in such manner that distillation of the volatile sulphur of the pyrites is effected.

2. The method of producing elemental sulphur which comprises subjecting pyrites in a distillation chamber to a distillation operation in such manner that distillation of the volatile sulphur atom is effected and a product corresponding substantially to the monosulphide of iron is produced, subjecting the resulting monosulphide in a suitable chamber to an oxidizing operation at a temperature substantially above 1,000 C. under such conditions that a high-temperature gaseous product containing sulphur dioxide is formed, withdrawing said gaseous product from the oxidizing chamber, passing the gaseous product after such withdrawal in contact with a bed of coke so as to reduce the sulphur dioxide and form a gaseous product containing elemental sulphur at a temperature of about 1,000° C., cooling the resulting gaseous product to a temperature of about 500 to 900° C., and passing the resulting cooled gaseous product containing elemental sulphur in contact with pyrites in the distillation chamber in such manner that distillation of the volatile sulphur of the pyrites is effected.

3. The method of producing elemental sulphur which comprises subjecting pyrites in a suspension distillation chamber to a suspension distillation operation in such manner that distillation of the volatile sulphur atom is effected and a product corresponding substantially to the monosulphide of iron is produced, subjecting the resulting monosulphide in finely divided form to a suspension roasting operation at a temperature above 1,000° C. in a suitable chamber under such conditions that a high-temperature gaseous product containing sulphur dioxide is formed, withdrawing said gaseous product from the roasting chamber, passing the gaseous product after such withdrawal in contact with a bed of coke so as to reduce the sulphur dioxide and form a gaseous product containing elemental sulphur, and passing the gaseous product containing elemental sulphur in contact with pyrites in the distillation chamber in such manner that distillation of the volatile sulphur of the pyrites is effected.

4. The method of producing elemental sulphur which comprises subjecting pyrites in a suspension distillation chamber to a suspension distillation operation in such manner that distillation of the volatile sulphur atom is effected and a product corresponding substantially to the monosulphite of iron is produced, subjecting the resulting monosulphide in finely divided form to a suspension roasting operation at a temperature substantially above 1000° C. under such conditions that a high-temperature gaseous product containing sulphur dioxide is formed, withdrawing said gaseous product from the oxidizing chamber, passing the gaseous product after such withdrawal in contact with a bed of coke so as to reduce the sulphur dioxide and form a gaseous product containing elemental sulphur at a temperature of about 1000° C., cooling the gaseous product to a temperature of about 500 to 900° C. and passing the resulting cooled gaseous product containing elemental sulphur in contact with pyrites in the distillation chamber in such manner that distillation of the volatile sulphur of the pyrites is effected.

5. The method of producing elemental sulphur which comprises subjecting pyrites in a distillation chamber to a distillation operation in such manner that distillation of the volatile sulphur atom is effected and a product corresponding substantially to the monosulphide of iron is produced, subjecting the resulting monosulphide in a suitable chamber to an oxidizing operation while in the form of a molten bath at a temperature substantially above 1000° C. under such conditions that a high-temperature gaseous product containing sulphur dioxide is formed, withdrawing said gaseous product from the oxidizing chamber, passing the gaseous product after such withdrawal in contact with a bed of coke so as to reduce the sulphur dioxide and form a gaseous product containing elemental sulphur, and passing the gaseous product containing elemental sulphur in contact with pyrites in the distillation chamber in such manner that distillation of the volatile sulphur of the pyrites is effected.

6. The method of producing elemental sulphur which comprises subjected pyrites in a distillation chamber to a distillation operation in such manner that distillation of the volatile sulphur atom is effected and a product corresponding substantially to the monosulphide of iron is produced, subjecting the resulting monosulphide in a suitable chamber to an oxidizing operation while in the form of a molten bath at a temperature substantially above 1000° C. under such conditions that a high-temperature gaseous product containing sulphur dioxide is formed, withdrawing said gaseous product from the oxidizing chamber, passing the gaseous product after such withdrawal in contact with a bed of coke so as to reduce the sulphur dioxide and form a gaseous product containing elemental sulphur at a temperature of about 1000° C. cooling the gaseous product to a temperature of about 500 to 900° C., and passing the resulting cooled gaseous product containing elemental sulphur in contact with pyrites in the distillation chamber in such manner that distillation of the volatile sulphur of the pyrites is effected.

RAYMOND F. BACON.
WILBER JUDSON.